Patented Mar. 14, 1950

2,500,218

UNITED STATES PATENT OFFICE 2,500,218

PROCESS FOR PREPARING 1,1,1-TRIFLUORO-2-BROMOETHANE

Edmund B. Towne and Joseph B. Dickey, Rochester, N. Y., assignors to Eastman Kodak Company, Rochester, N. Y., a corporation of New Jersey No Drawing. Application October 24, 1947, Serial No. 782,028

10 Claims. (Cl. 260—653)

This invention relates to an improved process for preparing 1,1,1-trifluoro-2-bromoethane and more particularly to the preparation of this compound by the fluorination of 1,1-dichloro-1,2-dibromoethane.

1,1,1-trifluoro-2-bromoethane was first prepared by Swarts, Compt. rend. 197, 1261 (1933), by a method which involved in addition to other steps the reduction with platinum oxide of trifluoroacetic acid to trifluoroethanol and subsequent bromination of this compound using phosphorous pentabromide to yield the desired compound. Obviously this method is costly and roundabout and therefore unsuited for commercial application. Henne and Renoll, J. Am. Chem. Soc. 58, 887 (1936), prepared $CF_3CH_2Br$ in very poor yield and in an impure state by reacting $CHBr_2CHBr_2$ with $SbF_3Cl_2$. More recently and since our work was completed $CF_3CH_2Br$ has been prepared in good yields by reacting $CCl_2BrCH_2Br$ with a mixture of mercuric oxide and hydrogen fluoride under pressure, Ind. Eng. Chem. 39, 411 (1947). However mercuric compounds are expensive and dangerous to work with, elaborate safety precautions being required in their commercial usage. Further, the high expense of the catalyst necessitates additional equipment for recovering and reconverting the mercuric residue to a usable form. Therefore, this process is unsound from a commercial standpoint.

Known methods for the preparation of $CF_3CH_2Cl$ were investigated in our efforts to devise a satisfactory process for preparing $CF_3CH_2Br$. When the process of U. S. Patent 2,230,925 (treatment of $CCl_3CH_2Cl$ with $SbF_3$, $SbF_3Cl_2$, and HF) was applied to $CBr_3CH_2Br$ only traces of $CF_3CH_2Br$ could be isolated. Likewise when $CCl_2BrCH_2Br$ was treated in accordance with this process negligible amounts of the desired trifluoro compound were formed.

We have found that when $CCl_3CH_2Cl$ is mixed with $SbF_3$ and a catalytic amount of $SbCl_5$ and heated in an autoclave at 125° C. an 86% yield of $CF_3CH_2Cl$ can be obtained. However, when this process was employed using $CCl_2BrCH_2Br$ as a starting material less than 2% of $CF_3CH_2Br$ was obtained.

It is, therefore, an object of this invention to provide a new and improved process for the preparation of 1,1,1-trifluoro-2-bromoethane. It is a further object of this invention to provide a process for the preparation of 1,1,1-trifluoro-2-bromoethane which is in essence simple and inexpensive. Another object of this invention is to provide a process which will place the preparation of this important chemical intermediate on a commercially feasible basis. Other objects will appear hereinafter.

We have discovered that 1,1,1-trifluoro-2-bromoethane can be obtained by heating 1,1-dichloro-1,2-dibromoethane in an autoclave with hydrogen fluoride and antimony trifluoride in the presence of antimony pentachloride as a catalyst. That hydrogen fluoride is an essential ingredient of the reaction mixture is apparent from the fact that when this compound was omitted only $CCl_2FCH_2Br$ and $CClF_2CH_2Br$ resulted from the process. That antimony trifluoride is likewise necessary was also determined by omitting it. Here again only $CCl_2FCH_2Br$ and $CClF_2CH_2Br$ were obtained.

The following examples illustrate the manner of carrying out the process of our invention.

Example 1

588 grams of $CCl_2BrCH_2Br$, 448 grams of antimony trifluoride, and 10 cc. of antimony pentachloride were placed in an autoclave, cooled to 0–5° C. There was then added 400 grams of anhydrous liquid hydrogen fluoride cooled to −78° C. The autoclave was sealed and the reaction mixture heated to 160° C. without shaking during 2 hours and maintained at this temperature for from one to two hours more, following which it was cooled to 0° C. There was considerable pressure in the autoclave and the discharge valve was opened to vent the formed gases through a water scrubber leading to a Dry-Ice condenser. The temperature of the autoclave was allowed to increase to 15° C. during which time 22 grams of low-boiling material were collected in the Dry-Ice receiver. At this point the autoclave was again sealed and the reaction mixture was heated to 150° C. and maintained at this temperature for seven hours. The reaction mixture was then cooled to 0° C. and the vapors passed through a water scrubber to remove hydrogen fluoride. The reaction product, $CF_3CH_2Br$, was collected in a Dry-Ice receiver, connected to the water scrubber, as the autoclave gradually came up to room temperature. Finally the autoclave was heated to 50° C. to complete the removal of product. The total yield of crude $CF_3CH_2Br$ was 318 grams or 85% of the theoretical yield based on $CCl_2BrCH_2Br$. This was washed with dilute sodium bicarbonate solution, dried, and fractionally distilled. The yield of pure $CF_3CH_2Br$ boiling at 26–27° C. was 247 grams (66%). The higher boiling residue consisting of a mixture of $CClF_2CH_2Br$ and $CF_3CH_2Br$ weighed 20 grams.

*Example 2*

490 grams of $CCl_2BrCH_2Br$, 448 grams of antimony trifluoride, 12.5 cc. of antimony pentafluoride, and 435 grams of hydrogen fluoride were charged into an autoclave, cooled to 5° C. The autoclave was sealed and heated gradually to 145° C. over a period of from one to two hours. The reaction mixture was then cooled to 0° C. and the formed gases were vented as in Example 1. The autoclave was sealed again and the reaction mixture was heated to 145° C. and maintained at this temperature for six hours, whereupon it was cooled to 0° C. The reaction mixture was worked up in accordance with the procedure described in Example 1. The yield of crude $CF_3CH_2Br$ was 257 grams (82.5%) and of purified $CF_3CH_2Br$ 202 grams (65%).

*Example 3*

588 grams of $CCl_2BrCH_2Br$, 376 grams of antimony trifluoride, 10 cc. of antimony pentachloride, and 420 grams of hydrogen fluoride were charged into an autoclave, cooled to 5° C. The autoclave was sealed and the reaction mixture was heated gradually to 165° C. over a period of from one to two hours. The reaction mixture was then cooled to 0° C. and the formed gases were vented as in Example 1. The autoclave was sealed again and the reaction mixture was heated to 150° C. and maintained at this temperature for nine hours, whereupon it was cooled to 0° C. The reaction mixture was worked up in accordance with the procedure described in Example 1. 274 grams of crude $CF_3CH_2Br$ were obtained which corresponds to a theoretical yield based on $CCl_2BrCH_2Br$ of 73%. When purified the yield was 214 grams (57%).

*Example 4*

512 grams of $CCl_2BrCH_2Br$, 394 grams of antimony trifluoride, 8 cc. of antimony pentachloride, and 620 grams of hydrogen fluoride were charged into an autoclave, cooled to 5° C. The autoclave was sealed and the reaction mixture was heated gradually over a period of about one hour to 155° C. and maintained at this temperature for thirty hours. The reaction mixture was then cooled to 0° C. and worked up in accordance with the procedure described in Example 1. The yield of crude $CF_3CH_2Br$ was 179 grams (55%) and of purified product 150 grams (46%).

While $CF_3CH_2Br$ can be prepared by heating $CCl_2BrCH_2Br$ with a mixture of antimony trifluoride, antimony pentachloride and hydrogen fluoride in accordance with the directions given herein without the cooling and venting steps greatly improved results are obtained when the reaction mixture is cooled below the boiling point of hydrogen fluoride and the first formed gaseous reaction products (principally hydrogen chloride with some hydrogen bromide) are vented. Accordingly, it is advantageous in carrying out the process of our invention to employ the cooling and venting operations just referred to and this represents the preferred form of our invention.

As illustrated in Example 4, when the venting step is omitted, a heating period up to thirty hours is insufficient to produce as high a yield as is obtained when heating periods of six to ten hours are used with venting incorporated in the process. When heating periods on the order of ten to fifteen hours at 140–160° C. are used without venting, the principal products obtained are $CCl_2FCH_2Br$ and $CClF_2CH_2Br$ with little or no $CF_3CH_2Br$. Therefore, a tremendous saving in time and increase in yield result from the discovery of the venting procedure. This probably means that the first step of the reaction is partial fluorination of $CCl_2BrCH_2Br$ to produce $CClF_2CH_2Br$. This is followed by the splitting out of HCl and HBr leaving an unsaturated intermediate (probably $CF_2=CHBr$) to which hydrogen fluoride then adds.

The composition of the fluorinating mixture may be varied within reasonable limits without appreciably affecting the yield of $CF_3CH_2Br$. In our process 1,1-dichloro-1,2-dibromoethane and antimony trifluoride are ordinarily employed in approximately equimolar amounts. However, a molar reduction up to 20% in the amount of antimony trifluoride used does not effect any substantial decrease in yield. Similarly, more than one mole proportion of antimony trifluoride can be used but is not necessary. In general, 0.7 to 1.5 mole proportion of antimony trifluoride is used. The amount of hydrogen fluoride used may also be varied considerably. While in our experiments we have successfully used as high as 15.5 mole proportions of hydrogen fluoride it is not necessary to use such high amounts. The use of 6 to 9 mole proportions appears to be advantageous although less than 6 and more than 15 mole proportions of hydrogen fluoride, for example, can be used. Antimony pentachloride is used in small, catalytic amounts, such as 0.025 to 0.05 mole proportions. While the proportions indicated are those that would normally be used, it will be understood that 1,1,1-trifluoro-2-bromoethane can be obtained even if these proportions are varied somewhat. Mole proportions are with respect to the amount of $CCl_2BrCH_2Br$ used.

The reaction temperature at which we prefer to carry out the fluorination of $CCl_2BrCH_2Br$ is between 140° and 170° C. It will be understood, however, that this preference constitutes no limitation upon the process of our invention as temperatures from 130° to 190° C., for example, can be used. The upper limit of temperatures is the point at which decomposition of the reactants begins to occur to an appreciable extent.

The order and manner of addition of starting materials is immaterial to the success of the reaction. We have found that the simplest and most convenient method is to place in the autoclave the calculated quantities of $CCl_2BrCH_2Br$, $SbF_3$ and $SbCl_5$ and then cool the whole in an ice-salt mixture to about 0° C. Anhydrous liquid hydrogen fluoride which has been previously cooled to approximately −78° C. is then added.

While we have disclosed the carrying out of our process in an autoclave it is to be clearly understood that any suitable closed reaction vessel can be employed whether termed an autoclave or not.

A large part of the value of our process lies in the utility of the compound 1,1,1-trifluoro-2-bromoethane. It can be adapted for use as a solvent or an intermediate in the preparation of larger molecules. Probably its most important use is in the latter connection. The advantage of this compound over the compound $CF_3CH_2Cl$ in alkylation reactions stems from the greater reactivity of the bromine atom over the corresponding chlorine atom. Therefore, the radical $CF_3CH_2-$ may be introduced into organic molecules with greater ease than when this is accomplished by using the corresponding chloro compound.

Coupling components useful in the preparation of azo compounds of use for the dyeing or coloration of cellulose acetate textile materials can be prepared by reacting an aminobenzene compound such as, for example, aniline, m-chloroaniline and m-toluidine with 1,1,1-trifluoro-2-bromoethane in the presence of an acid binding agent such as, for example, sodium carbonate, potassium carbonate, sodium hydroxide and sodium bicarbonate. These coupling components when coupled with diazotized aromatic amines such as p-nitroaniline, o-chloro-p-nitroaniline, 2,6-dichloro-4-nitroaniline and 2-bromo-6-chloro-4-nitroaniline, for example, yield valuable dyes for the coloration of cellulose acetate textile materials. Azo compounds of the character just indicated are described and claimed in Dickey application Serial No. 631,469, filed November 28, 1945. The preparation of these compounds is indicated hereinafter.

*Example A.—N-(2,2,2-trifluoroethyl) aniline*

17 grams of 1,1,1-trifluoro-2-bromoethane, 9.3 grams of aniline and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure (2 mm., for example) to give a good yield of N-(2,2,2-trifluoroethyl) aniline which is a colorless liquid boiling at 84° C.–85° C./15 mm. and which has a refractive index of $n_D^{20}$ 1.4818.

By the substitution of 12.8 grams of m-chloroaniline, and 10.7 grams of m-toluidine for aniline in the foregoing example, N-(2,2,2-trifluoroethyl)-m-chloroaniline and N-(2,2,2-trifluoroethyl)-m-toluidine, respectively, are obtained.

*Example B.—N-β-hydroxyethyl-N-(2,2,2-trifluoroethyl) aniline*

17 grams of N-(2,2,2-trifluoroethyl) aniline, 5 grams of ethylene oxide and 50 cc. of dioxane are heated together with stirring in an autoclave at 180° C. for six hours. Upon cooling, the reaction mixture is removed from the autoclave and distilled under reduced pressure. N-β-hydroxyethyl-N-(2,2,2-trifluoroethyl) aniline boiling at 102° C.–103° C./1.5 mm. is obtained.

By the use of 20.9 grams of N-(2,2,2-trifluoroethyl)-m-chloroaniline in place of the N-(2,2,2-trifluoroethyl) aniline in the foregoing example a good yield of N-β-hydroxyethyl-N-(2,2,2-trifluoroethyl)-m-chloroaniline is obtained. Similarly, if 18.9 grams of N-(2,2,2-trifluoroethyl)-m-toluidine are used in the foregoing example a good yield of N-β-hydroxyethyl-N-(2,2,2-trifluoroethyl)-m-toluidine is obtained.

*Example C. — 1-(4-nitrophenylazo-4-(N-β-hydroxyethyl)-N-2,2,2-trifluoroethyl)-aminobenzene*

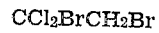

13.8 grams of p-nitroaniline are dissolved in 150 cc. of water and 25 cc. of 36% hydrochloric acid. The solution resulting is cooled to a temperature approximating 0–5° C. and the p-nitroaniline is diazotized while maintaining this temperature by the addition, with stirring, of a water solution of 6.9 grams of sodium nitrite.

21.9 grams of N-β-hydroxyethyl-N-(2,2,2-trifluoroethyl) aniline are dissolved in 200 cc. of cold dilute aqueous hydrochloric acid and the diazonium solution prepared as described above is gradually added with stirring. Following the addition of the diazonium solution the mixture resulting is stirred, while maintaining a temperature of 0°–10° C., for about 30 minutes after which the coupling reaction which takes place is completed by neutralizing the hydrochloric acid with sodium acetate. The dye compound formed is recovered by filtration, washed with water and dried. It colors cellulose acetate rayon and nylon red shades.

*Example D. — 1-(4-nitrophenylazo-4-(N-β-hydroxyethyl)-N-2,2,2-trifluoroethyl) - m-chloroaniline*

13.8 grams of p-nitroaniline are diazotized and the diazonium compound obtained is coupled with 25.3 grams of N-β-hydroxyethyl-N-(2,2,2-trifluoroethyl)-m-chloroaniline. The diazotization, coupling and dye recovery operations can be carried out in accordance with the procedure described in Example 1. The dye compound obtained colors cellulose acetate rayon and nylon orange shades.

*Example E. — 1-(2-chloro-4-nitrophenylazo)-2-methyl-4-(N-β-hydroxyethyl-N - (2,2,2-trifluoroethyl)-aminobenzene*

17.3 grams of o-chloro-p-nitroaniline are diazotized and the diazonium compound obtained is coupled with 23.3 grams of N-β-hydroxyethyl-N-(2,2,2-trifluoroethyl)-m-toluidine. The diazotization, coupling and dye recovery operations can be carried out in accordance with the procedure described in Example 1. The dye compound obtained colors cellulose acetate rayon and nylon rubine shades.

The dye compounds obtained by coupling diazotized p-nitroaniline with N-(2,2,2-trifluoroethyl) aniline, N-(2,2,2-trifluoroethyl)-m-chloroaniline and N-(2,2,2-trifluoroethyl)-m-toluidine color cellulose acetate textile materials yellowish-orange shades, the shade in the latter case being more orange than in the first two cases.

So far as we are aware the pressure under which our process is carried out is not critical and is subject to considerable variation depending, for example, upon the proportions of the reactants employed, such as the amount of hydrogen fluoride used, the temperature at which the reaction is carried out and the size of the reaction vessel with respect to the amount of reactants employed. The pressures in Examples 1 to 3 prior to venting were of the order of 800–1000 pounds per square inch and less after venting. In Example 4 the pressure was slightly higher than in Examples 1 to 3. While it is very difficult to set forth limits because of the variables involved our experiments indicate that good results are obtained when the reaction mixture is heated at a temperature of 130° C.–190° C., particularly 140° C.–170° C., for 1 to 2 hours prior to venting. The pressures developed under these reaction conditions are substantial as that term is used herein and are normally 200 or more pounds per square inch.

We claim:
1. The process of preparing 1,1,1-trifluoro-2-bromoethane which comprises heating

$$CCl_2BrCH_2Br$$

with antimony trifluoride, hydrogen fluoride and antimony pentachloride in a closed reaction vessel at a temperature below which appreciable decomposition of the reactants occurs and under pressure to form 1,1,1-trifluoro-2-bromoethane and recovering the 1,1,1-trifluoro-2-bromoethane thus formed.

2. The process of preparing 1,1,1-trifluoro-2-bromoethane which comprises heating CCl₂BrCH₂Br with antimony trifluoride, hydrogen fluoride and antimony pentachloride in a closed reaction vessel at a temperature below which appreciable decomposition of the reactants occurs until a substantial pressure is built up in the reaction vessel, cooling the reaction mixture below the boiling point of hydrogen fluoride and then venting the gases formed during the heating operation above described, again heating the reaction mixture at a temperature below which appreciable decomposition of the reactants occurs until formation of 1,1,1-trifluoro-2-bromoethane is complete and recovering the 1,1,1-trifluoro-2-bromoethane thus formed.

3. The process of preparing 1,1,1-trifluoro-2-bromoethane which comprises heating CCl₂BrCH₂Br with antimony trifluoride, hydrogen fluoride and antimony pentachloride in a closed reaction vessel at a temperature of 140° C.–170° C. and under pressure to form 1,1,1-trifluoro-2-bromoethane and recovering the 1,1,1-trifluoro-2-bromoethane thus formed.

4. The process of preparing 1,1,1-trifluoro-2-bromoethane which comprises heating CCl₂BrCH₂Br with antimony trifluoride, hydrogen fluoride and antimony pentachloride in a closed reaction vessel at a temperature of 140° C.–170° C. until a substantial pressure is built up in the reaction vessel, cooling the reaction mixture below the boiling point of hydrogen fluoride and then venting the gases formed during the heating operation above described, again heating the reaction mixture to a temperature of 140° C.–170° C. and maintaining the reaction mixture at this temperature until formation of 1,1,1-trifluoro-2-bromoethane is complete and recovering the 1,1,1-trifluoro-2-bromoethane thus formed.

5. The process of preparing 1,1,1-trifluoro-2-bromoethane which comprises heating CCl₂BrCH₂Br with antimony trifluoride and hydrogen fluoride in the presence of antimony pentachloride as a catalyst in a closed reaction vessel at a temperature of 140° C.–170° C. for 1 to 2 hours, cooling the reaction mixture below the boiling point of hydrogen fluoride and then venting the gases formed during the heating operation above described, again heating the reaction mixture to a temperature of 140° C.–170° C. and maintaining the reaction mixture at this temperature until formation of 1,1,1-trifluoro-2-bromoethane is complete and recovering the 1,1,1-trifluoro-2-bromoethane thus formed.

6. The process of preparing 1,1,1-trifluoro-2-bromoethane which comprises heating CCl₂BrCH₂Br with antimony trifluoride and hydrogen fluoride in the presence of antimony pentachloride as a catalyst in a closed reaction vessel at a temperature of 140° C.–170° C. to form 1,1,1-trifluoro-2-bromoethane and recovering the 1,1,1-trifluoro-2-bromoethane thus formed.

7. The process of preparing 1,1,1-trifluoro-2-bromoethane which comprises heating one mole equivalent of CCl₂BrCH₂Br with 0.7 to 1.5 mole proportion of antimony trifluoride and 6 to 15 mole proportions of hydrogen fluoride in the presence of antimony pentachloride as a catalyst in a closed reaction vessel at a temperature below which appreciable decomposition of the reactants occurs and under pressure to form 1,1,1-trifluoro-2-bromoethane and recovering the 1,1,1-trifluoro-2-bromoethane thus formed.

8. The process of preparing 1,1,1-trifluoro-2-bromoethane which comprises heating one mole equivalent of CCl₂BrCH₂Br with 0.7 to 1.5 mole proportion of antimony trifluoride and 6 to 15 mole proportions of hydrogen fluoride in the presence of antimony pentachloride as a catalyst in a closed reaction vessel at a temperature below which appreciable decomposition of the reactants occurs until a substantial pressure is built up in the reaction vessel, cooling the reaction mixture below the boiling point of hydrogen fluoride and then venting the gases formed during the heating operation above described, again heating the reaction mixture at a temperature below which appreciable decomposition of the reactants occurs until formation of 1,1,1-trifluoro-2-bromoethane is complete and recovering the 1,1,1-trifluoro-2-bromoethane thus formed.

9. The process of preparing 1,1,1-trifluoro-2-bromoethane which comprises heating one mole equivalent of CCl₂BrCH₂Br with 0.7 to 1.5 mole proportion of antimony trifluoride and 6 to 15 mole proportions of hydrogen fluoride in the presence of antimony pentachloride as a catalyst in a closed reaction vessel at a temperature of 140° C.–170° C. for 1 to 2 hours, cooling the reaction mixture below the boiling point of hydrogen fluoride and then venting the gases formed during the heating operation above described, again heating the reaction mixture to a temperature of 140° C.–170° C. and maintaining the reaction mixture at this temperature until formation of 1,1,1-trifluoro-2-bromoethane is complete and recovering the 1,1,1-trifluoro-2-bromoethane thus formed.

10. The process of preparing 1,1,1-trifluoro-2-bromoethane which comprises heating CCl₂BrCH₂Br with antimony trifluoride and hydrogen fluoride in the presence of antimony pentachloride as a catalyst in a closed reaction vessel at a temperature below which appreciable decomposition of the reactants occurs to form 1,1,1-trifluoro-2-bromoethane and recovering the 1,1,1-trifluoro-2-bromoethane thus formed.

EDMUND B. TOWNE.
JOSEPH B. DICKEY.

REFERENCES CITED

The following references are of record in the file of this patent:

UNITED STATES PATENTS

| Number | Name | Date |
| --- | --- | --- |
| 2,024,008 | Midgley, Jr., et al. | Dec. 10, 1935 |
| 2,024,095 | Daudt et al. | Dec. 10, 1935 |

OTHER REFERENCES

McBee et al., Ind., Eng. Chem., vol. 39, 409–412 (1947).